(12) United States Patent
Lee et al.

(10) Patent No.: US 8,501,054 B2
(45) Date of Patent: Aug. 6, 2013

(54) APPARATUS AND METHOD FOR MANUFACTURING MICRO LENS ARRAY

(75) Inventors: Han Sup Lee, Incheon (KR); Byoung Guk Park, Incheon (KR); Yi Seul Yang, Incheon (KR); Ki Woon Choi, Incheon (KR); Joon Ho Lee, Gwangmyeong-si (KR); Ki Ho Park, Incheon (KR); Hoi Chang Yang, Incheon (KR)

(73) Assignee: Inha-Industry Partnership Institute, Incheon (KR)

( * ) Notice: Subject to any disclaimer, the term of this patent is extended or adjusted under 35 U.S.C. 154(b) by 235 days.

(21) Appl. No.: 12/922,628

(22) PCT Filed: Jun. 3, 2010

(86) PCT No.: PCT/KR2010/003572
§ 371 (c)(1),
(2), (4) Date: Sep. 14, 2010

(87) PCT Pub. No.: WO2011/004966
PCT Pub. Date: Jan. 13, 2011

(65) Prior Publication Data
US 2011/0127684 A1 Jun. 2, 2011

(30) Foreign Application Priority Data

Jul. 9, 2009 (KR) .......................... 10-2009-0062689
Sep. 16, 2009 (KR) .......................... 10-2009-0087637
Sep. 16, 2009 (KR) .......................... 10-2009-0087639

(51) Int. Cl.
*B29D 11/00* (2006.01)

(52) U.S. Cl.
USPC ............ 264/2.2; 264/293; 264/1.32; 264/2.7; 264/101; 425/385

(58) Field of Classification Search
USPC ............ 264/293, 1.32, 2.2, 2.7, 101; 425/385
See application file for complete search history.

(56) References Cited

U.S. PATENT DOCUMENTS

| | | | |
|---|---|---|---|
| 6,257,866 B1 * | 7/2001 | Fritz et al. .................. | 425/387.1 |
| 7,798,802 B2 * | 9/2010 | Cho et al. .................. | 425/385 |
| 2007/0275114 A1 * | 11/2007 | Cherala et al. ............. | 425/405.1 |

FOREIGN PATENT DOCUMENTS

JP 2008110494 A * 5/2008

* cited by examiner

*Primary Examiner* — Amjad Abraham
(74) *Attorney, Agent, or Firm* — Sherr & Jiang, PLLC

(57) ABSTRACT

An apparatus for manufacturing a micro lens array, wherein lenses having various standards are easily manufactured by forming a micro lens array by adjusting a vacuum condition in a vacuum chamber. The apparatus including: a vacuum chamber including a vacuum space therein; a vacuum unit for forming a vacuum inside the vacuum chamber; an upper frame disposed inside the vacuum chamber and to which a substrate is installed on a lower surface of the upper frame; an elevator for ascending and descending the upper frame; a lower frame disposed below the upper frame; a master plate disposed on the lower frame and includes a plurality of molding grooves on an upper surface of the master plate; and a heater installed to a side of the master plate to heat up the master plate.

2 Claims, 14 Drawing Sheets

APPARATUS AND METHOD FOR MANUFACTURING MICRO LENS ARRAY

CROSS-REFERENCE TO RELATED PATENT APPLICATIONS

This application is a National Stage Patent Application of PCT International Patent Application No. PCT/KR2010/003572 (filed on Jun. 3, 2010), which claims the benefit of Korean Patent Applications No. 10-2009-0062689, filed on Jul. 9, 2009, No. 10-2009-0087637, filed on Sep. 16, 2009 and No. 10-2009-0087639, filed on Sep. 16, 2009 in the Korean Intellectual Property Office, the disclosure of which are incorporated herein in their entirety by reference.

BACKGROUND OF THE INVENTION

1. Field of the Invention

The present invention relates to an apparatus and method of manufacturing a lens, and more particularly, to an apparatus and method of manufacturing a micro lens array, wherein micro lenses having various standards are easily manufactured by adjusting a vacuum condition in a vacuum chamber.

2. Description of the Related Art

Generally, a charge-coupled device (CCD) of a digital camera, a display device, such as a liquid crystal display (LCD) monitor for a computer, a part for an optical communication, or a light emitting diode device includes a lens, specifically a micro lens, so as to control convergence, diffusion, reflection, etc. of light. Here, such a lens is realized in any shape to have a desired optical property according to a purpose.

Conventionally, a mold is used to realize the lens. However, when the mold is used, the mold not only needs to be elaborately manufactured, but also needs to be changed whenever a shape of the lens is changed.

Specifically, in case of a micro lens having a complex structure, wherein a plurality of concave or convex shapes are formed on a spherical surface of a concave or convex lens, a shape of the micro lens is complex, and thus it is difficult to manufacture the micro lens by using the mold.

Also, a lens manufactured by using a conventional mold has an unsmooth surface, and is separately hardened by using an ultraviolet (UV) light while manufacturing the lens.

SUMMARY OF THE INVENTION

The present invention provides an apparatus and method of manufacturing a micro lens array, wherein a lens having a smooth surface and various shapes is easily manufactured in a micro unit since an elaborately manufactured mold is not required.

According to an aspect of the present invention, there is provided an apparatus for manufacturing a micro lens array, the apparatus including: a vacuum chamber including a vacuum space therein; a vacuum unit for forming a vacuum inside the vacuum chamber; an upper frame disposed inside the vacuum chamber and to which a substrate is installed on a lower surface of the upper frame; an elevator for ascending and descending the upper frame; a lower frame disposed below the upper frame; a master plate disposed on the lower frame and includes a plurality of molding grooves on an upper surface of the master plate; and a heater installed to a side of the master plate to heat up the master plate.

The substrate may be formed of a polymer material, and the heater may heat the substrate to 100° C. to 300° C. by using the master plate as a medium. The apparatus may further include a controller for controlling a degree of vacuum of the vacuum chamber or a lens forming time from opening the vacuum chamber to separating the substrate, according to a type of a lens.

The controller may increase the degree of vacuum of the vacuum chamber higher than a reference value if curvature of the lens is higher than a reference value, and decrease the degree of the vacuum of the vacuum chamber lower than the first reference value if the curvature of the lens is lower than the second reference value. The controller may set the lens forming time longer than a lens forming time corresponding to a reference lens if curvature of the lens is larger than that of the reference lens, and set the lens forming time shorter than the lens forming time corresponding to the reference lens if the curvature of the lens is smaller than that of the reference lens.

According to another aspect of the present invention, there is provided a method of manufacturing a micro lens array, the method including: preparing a master plate including a plurality of molding grooves on one side of the master plate, inside a vacuum chamber; preparing a substrate constituting a raw material of a lens on the side of the master plate; forming a vacuum inside the vacuum chamber; adhering the master plate and the substrate; heating the substrate after adhering the master plate and the substrate; releasing the vacuum in the vacuum chamber by opening the vacuum chamber after heating the substrate; and forming the lens by separating the substrate from the master plate after cooling down the master plate and the substrate.

The forming of the vacuum may include adjusting a shape of the lens by adjusting a degree of vacuum in the vacuum chamber. The forming of the lens may include adjusting the shape of the lens by adjusting a lens forming time.

According to another aspect of the present invention, there is provided a method of manufacturing a micro lens array, the method including: preparing a master plate, which includes a plurality of molding grooves corresponding to a minute pattern of a micro lens array to be manufactured on one side of the master plate, inside a vacuum chamber, in which a temperature and a degree of vacuum are adjustable; preparing a substrate constituting a raw material of the micro lens array inside the vacuum chamber; adhering the substrate to the master plate; fusing the master plate and the substrate to each other by heating the master plate and the substrate; forming a vacuum inside the vacuum chamber; forming an array of concave lenses in a micro unit on one side of the substrate according to a pressure difference; releasing the vacuum by opening the vacuum chamber; and cooling the master plate and the substrate and then separating the substrate from the master plate.

The substrate may be a polymer film formed of a polymer material, and the fusing of the master plate and the substrate may include heating the substrate to 100° C. to 300° C. by using the master plate as a medium.

The forming of the vacuum may include adjusting a shape of the concave lens by adjusting the degree of vacuum in the vacuum chamber. The degree of vacuum of the vacuum chamber may be increased higher than a reference value if curvature of the concave lens is higher than a reference value, and the degree of vacuum of the vacuum chamber may be decreased lower than the first reference value if the curvature of the concave lens is lower than the second reference value.

The forming of the array of the concave lenses may include adjusting a shape of the concave lens by adjusting a lens forming time. The lens forming time may be set longer than a lens forming time corresponding to the reference value if the curvature of the concave lens is higher than the reference value, and the lens forming time may be set shorter than the lens forming time corresponding to the reference value if the curvature of the concave lens is lower than the reference value.

According to another aspect of the present invention, there is provided a method of manufacturing a micro lens array, the method including: preparing a first master plate, which includes a plurality of first molding grooves having a first minute arrangement pattern on one side of the first mater plate, inside a first vacuum chamber, in which a temperature and a degree of vacuum are adjustable; preparing a substrate constituting a raw material of a lens inside the first vacuum chamber; completing a first lens array substrate by forming a plurality of first lenses in a micro unit on one side of the substrate by using spaces of the plurality of first molding grooves that are formed to be sealed when the first master plate and the substrate adhere to each other, and a pressure difference of the first vacuum chamber; cooling down the first master plate and the first lens array substrate, and then separating the first lens array substrate from the first master plate; preparing a second master plate, which includes a plurality of second molding grooves having a second minute arrangement pattern on one side of the second master plate, wherein the plurality of second molding grooves have a wider arrangement intervals than the plurality of first molding grooves and include the plurality of first molding grooves, inside a second vacuum chamber, in which a temperature and a degree of vacuum are adjustable; preparing the first lens array substrate inside the second vacuum chamber; completing a complex lens array by forming a plurality of complex lenses each including the plurality of first lenses on the side of the first lens array substrate where the plurality of first lenses are formed, by using spaces of the plurality of second molding grooves that are formed to be sealed when the second master plate and the first lens array substrate adhere to each other, and a pressure difference of the second vacuum chamber; and cooling down the second master plate and the complex lens array, and then separating the complex lens array from the second master plate.

The completing of the first lens array substrate may include: forming a vacuum inside the first vacuum chamber; adhering the first master plate and the substrate; fusing the first master plate and the substrate to each other by heating the first master plate and the substrate; releasing the vacuum inside the first vacuum chamber by opening the first vacuum chamber; and forming the first lens array substrate by forming the plurality of first lenses constituting convex lenses in a micro unit on the side of the substrate according to a pressure difference.

The completing of the complex lens array may include: forming a vacuum inside the second vacuum chamber; adhering the second master plate to the first lens array substrate; fusing the second master plate and the first lens array substrate by heating the second master plate and the first lens array substrate; releasing the vacuum inside the second vacuum chamber by opening the second vacuum chamber; and forming the complex lens array including the plurality of complex lenses having a convex lens shape and each having the plurality of first lenses, according to a pressure difference. Alternatively, the completing of the complex lens array may include: adhering the second master plate and the first lens array substrate; fusing the second master plate and the first lens array substrate to each other by heating the second master plate and the first lens array substrate; forming a vacuum inside the second vacuum chamber; forming a complex lens array including the plurality of complex lenses having a convex lens shape and each having the plurality of first lenses, according to a pressure difference; and releasing the vacuum by opening the second vacuum chamber.

The completing of the first lens array substrate may include: adhering the first master plate and the substrate; fusing the first master plate and the substrate to each other by heating the first master plate and the substrate; forming a vacuum inside the first vacuum chamber; forming the first lens array substrate by forming the plurality of first lenses constituting concave lenses on one side of the substrate, according to a pressure difference; and releasing the vacuum inside the first vacuum chamber by opening the first vacuum chamber.

The completing of the complex lens array may include: forming a vacuum inside the second vacuum chamber; adhering the second master plate and the first lens array substrate; fusing the second master plate and the first lens array substrate by heating the second master plate and the first lens array; releasing the vacuum inside the second vacuum chamber by opening the second vacuum chamber; and forming the complex lens array including the plurality of complex lenses having a convex lens shape and each including the plurality of first lenses, according to a pressure difference. The completing of the complex lens array may include: adhering the second master plate to the first lens array substrate; fusing the second master plate to the first lens array substrate by heating the second master plate and the first lens array substrate; forming a vacuum inside the second vacuum chamber; forming the complex lens array including the plurality of complex lenses having a convex lens shape and each including the plurality of first lenses, according to a pressure difference; and releasing the vacuum by opening the second vacuum chamber.

The substrate may be a polymer film formed of a polymer material, and the fusing may include heating at least one of the substrate and the first lens array substrate to 100° C. to 300° C. by using at least one of the first master plate and the second master plate as a medium.

The forming of the vacuum may include adjusting shapes of at least one of the first lens and the complex lens by adjusting the degrees of vacuum of at least one of the first and second vacuum chambers.

The forming of the first lens array substrate and the forming of the complex lens array may include adjusting the shapes of at least one of the first lens and the complex lens by adjusting a lens forming time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
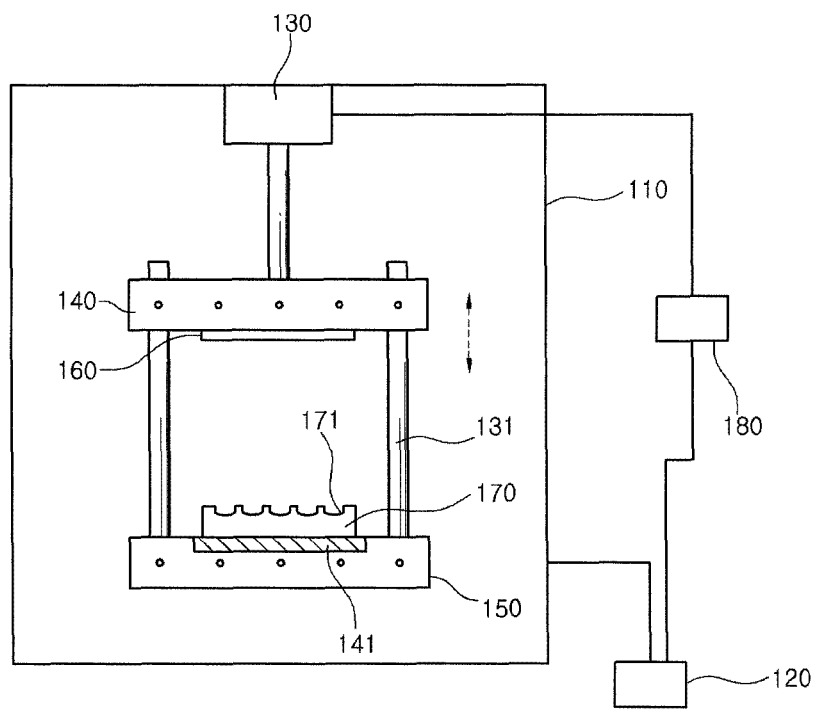
FIGS. 1 and 2 are diagrams respectively illustrating a substrate of an apparatus for manufacturing a lens being ascended and descended, according to a first embodiment of the present invention.

Hereinafter, the present invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements.

Unless defined otherwise, technical and scientific terms used herein have the same meaning as is commonly understood by one of skill in the art to which this invention belongs.

Figure 2:
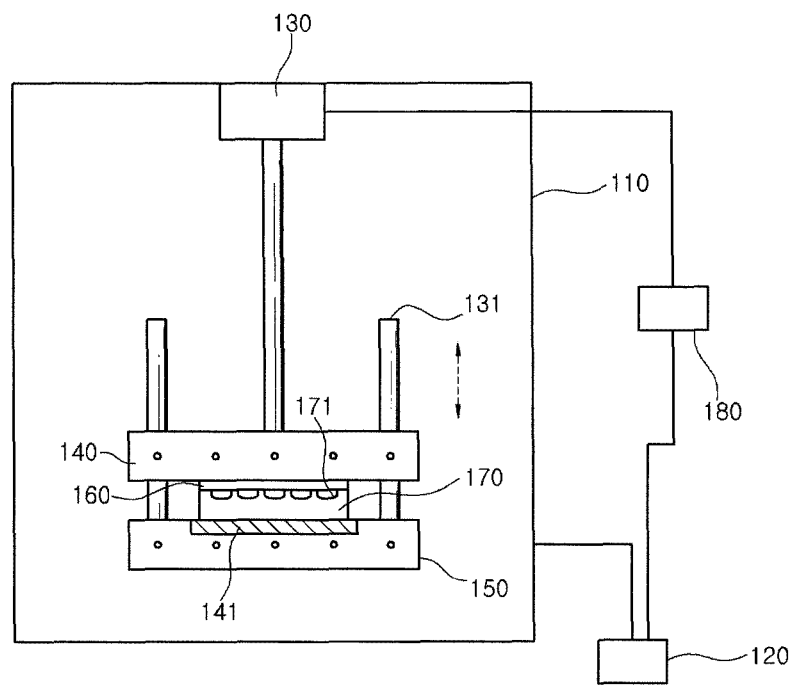
Figure 3:
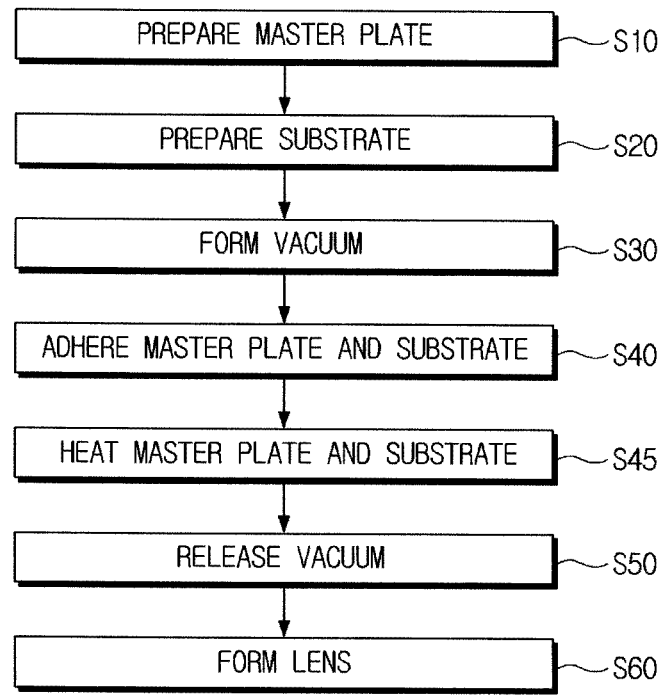
FIG. 3 is a flowchart of a method of manufacturing a lens, according to the first embodiment of the present invention.
Figure 4:
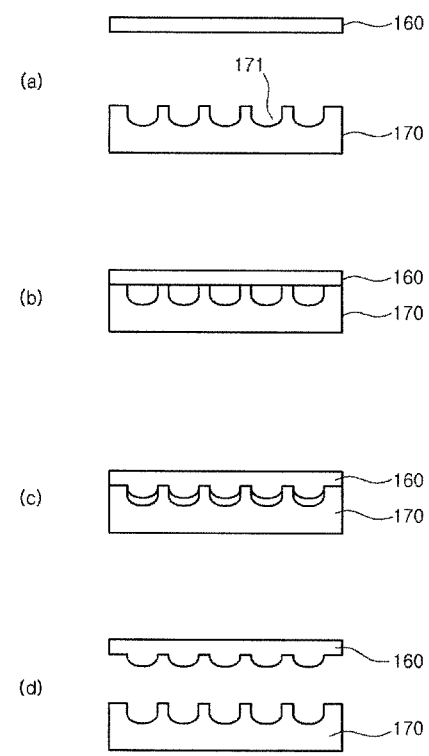
FIG. 4 is diagrams for describing processing of a substrate and a master plate according to the method of the first embodiment of the present invention.

FIGS. 1 and 2 are diagrams respectively illustrating a substrate 160 of an apparatus 100 for manufacturing a lens being ascended and descended, according to a first embodiment of the present invention, FIG. 3 is a flowchart of a method of manufacturing a lens, according to the first embodiment of the present invention, and FIG. 4 is diagrams for describing processing of the substrate 160 and a master plate 170 according to the method of the first embodiment of the present invention.

As shown in FIGS. 1 and 2, the apparatus 100 according to the first embodiment of the present invention includes a vacuum chamber 110, a vacuum unit 120, an elevator 130, an upper frame 140, a lower frame 150, and the master plate 170.

The vacuum chamber 110 may be selectively sealed to form a vacuum space therein. Also, a vacuum unit 120 for selectively forming a vacuum inside the vacuum chamber 110 may be disposed on one side of the vacuum chamber 110. The vacuum unit 120 may include a vacuum pump (not shown) for forming a vacuum pressure, or a fluid line (not shown) for transferring a fluid such as air, but details about the vacuum pump or the fluid line will not be described herein.

The upper frame 140 is disposed inside the vacuum chamber 110, and is installed to ascend and descend along a guide bar 131.

Also, the elevator 130 for ascending and descending the upper frame 140 is installed above the upper frame 140. The elevator 130 may be an elevating cylinder, wherein an upper portion of the elevating cylinder is installed to a ceiling of the vacuum chamber 110, and a load end portion of the elevating cylinder is installed to the upper frame 140. Accordingly, the upper frame 140 ascends and descends along the guide bar 131 as the load end portion of the elevating cylinder move forward and backward.

The substrate 160 constituting a raw material of a lens is installed to a lower surface of the upper frame 140. The substrate 160 is formed of a polymer material. A material of the substrate 160 is selected according to a type of the lens, and generally may be polycarbonate (PC), polymethyl methacrylate (PMMA), polystyrene (PS), or the like.

The lower frame 150 is installed on a bottom surface of the vacuum chamber 110 while being spaced apart from a bottom of the upper frame 140.

A plurality of molding grooves 171 are formed on an upper surface of the master plate 170. The molding groove 171 is a groove having a cylindrical shape, and a depth of the molding groove 171 is formed to be larger than a thickness of the lens to be actually manufactured. The molding groove 171 according to the current embodiment of the present invention has a cylindrical shape, but the molding groove 171 may have any other shape.

A number of the molding grooves 171 is determined based on a number of lenses to be manufactured at once.

A heater 141 for heating the master plate 170 is installed in the lower frame 150 below the master plate 170.

The heater 141 may be a hot-wire heater, and heats up the master plate 170. The heated master plate 170 heats the substrate 160 on the master plate 170 to 100° C. to 300° C. If the heated master plate 170 heats the substrate 160 to 100° C. or lower, a lens may not be smoothly formed since the substrate 160 does not transform, and if the heated master plate 170 heats the substrate 160 to 300° C. or above, a shape of a lens may not be precise since the substrate 160 transforms too much.

Also, a controller 180 is installed on an outer side of the vacuum chamber 110. The controller 180 controls the vacuum unit 120 and the elevating cylinder according to a shape of the lens input by a user.

In other words, when the user selects a standard lens, the controller 180 controls the vacuum unit 120 in such a way that a degree of vacuum of the vacuum chamber 110 is set to a predetermined value, and controls the elevator 130 to ascend the upper frame 140 after a predetermined period of time after the vacuum is released.

Meanwhile, when the user selects a lens having a larger curvature than the standard lens, the controller 180 controls the vacuum unit 120 in such a way that the degree of vacuum of the vacuum chamber 110 is increased, and controls the elevator 130 to delay a point of time when the upper frame 140 is ascended to extend a lens forming time after the vacuum is released.

Alternatively, when the user selects a lens having a smaller curvature than the standard lens, the controller 180 controls the vacuum unit 120 in such a way that the degree of vacuum of the vacuum chamber 110 is decreased, and controls the elevator 130 to advance the point of time when the upper frame 140 is ascended to shorten the lens forming time after the vacuum is released.

The apparatus 100 according to the current embodiment of the present invention operates as follows.

When a lens is manufactured, the substrate 160 is installed to a lower surface of the upper frame 140 installed inside the vacuum chamber 110. Also, the master plate 170 is installed to an upper surface of the lower frame 150.

Next, the vacuum chamber 110 is sealed, and a vacuum is formed inside the vacuum chamber 110 by using the vacuum unit 120.

When the vacuum is formed inside the vacuum chamber 110, the elevator 130 descends the upper frame 140 toward the lower frame 150 as shown in FIG. 2, so that the substrate 160 is disposed on the upper surface of the master plate 170.

When the substrate 160 and the master plate 170 adhere to each other as the substrate 160 is mounted on the upper surface of the master plate 170, the heater 141 heats up the master plate 170 and the heated master plate 170 heats up the substrate 160 on the master plate 170.

When the vacuum inside the vacuum chamber 110 is released, the vacuum chamber 100 maintains an air pressure whereas an inner portion of the molding groove 171 forms a vacuum. Accordingly, there is a pressure difference between the vacuum chamber 110 and the molding groove 171, and thus adheres the substrate 160 and the master plate 170 are more closely adhered to each other.

Also, the substrate 160 protrudes into the molding groove 171 according to the pressure difference, thereby forming a shape of a lens.

When the shape of the lens is formed, the substrate 160 and the master plate 170 are cooled down, and are separated from each other to complete forming the lens.

The method of manufacturing a lens, according to the first embodiment of the present invention will now be described.

FIG. 3 is a flowchart of the method of manufacturing a lens, according to the first embodiment of the present invention, and FIG. 4 is diagrams for describing processing of the substrate 160 and the master plate 170 according to the method of the first embodiment of the present invention.

As shown in FIG. 3, the method according to the first embodiment of the present invention includes preparing the master plate 170 in operation S10, preparing the substrate 160 in operation S20, forming a vacuum in operation S30, adhering the master plate 170 and the substrate 160 in operation S40, heating the master plate 170 and the substrate 160 in operation S45, releasing the vacuum in operation S50, and forming a lens in operation S60.

In operation S10, the master plate 170 including the plurality of molding grooves 171 is prepared inside the vacuum chamber 110, and in operation S20, the substrate 160 is prepared inside the vacuum chamber 110.

A shown in FIG. 4 (a), when operations S10 and S20 are completed, the vacuum is formed inside the vacuum chamber 110 in operation S30. In operation S30, the vacuum is formed inside the vacuum chamber 110 by using the vacuum unit 120. Here, a vacuum pressure of the vacuum chamber 110 is adjusted according to a shape of a lens to be formed.

When the vacuum is formed inside the vacuum chamber 110, the substrate 160 and the master plate 170 are adhered to each other in operation S40 as shown in FIG. 4 (b), and then the substrate 160 is heated by using the heater 141 in operation S45.

Next, the vacuum chamber 110 is opened to release the vacuum inside the vacuum chamber 110 in operation S50.

After the vacuum is released, a pressure difference is generated between the molding grooves 171, and the substrate 160 and the master plate 170, and thus the substrate 160 protrudes toward the molding grooves 171 to form lens shapes as shown in FIG. 4 (c).

When the substrate 160 forms the lens shapes, the substrate 160 is cooled down, and the substrate 160 and the master plate 170 are separated from each other as shown in FIG. 4 (d) to complete the lens in operation S60.

Here, the lens shapes differ based on a lens forming time, i.e., time taken from when the vacuum is released to when the substrate 160 and the master plate 170 are separated from each other. Thus, the lens forming time is adjusted according to the shape of the lens to be formed.

Figure 5:
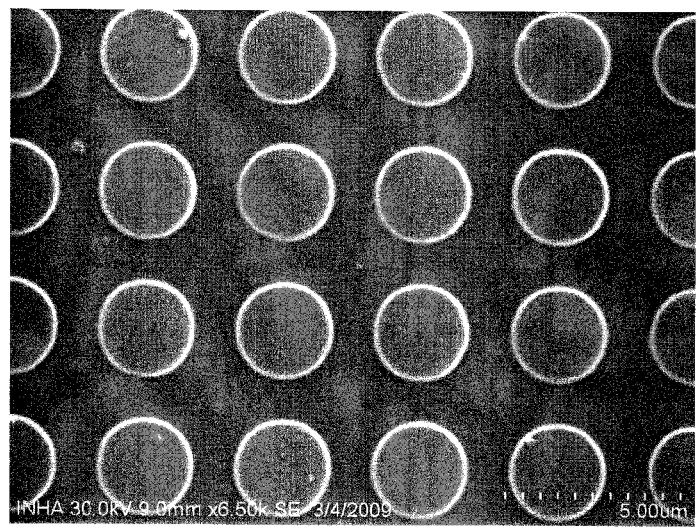
FIGS. 5 and 6 are plan views of lenses manufactured according to a method of manufacturing a lens, according to a second embodiment of the present invention.
Figure 6:
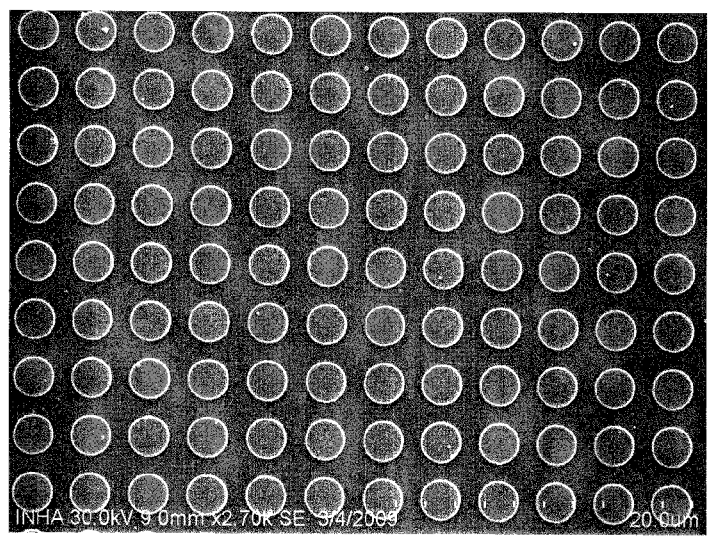
Figure 7:
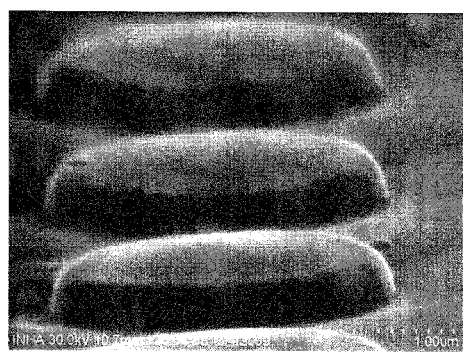
FIG. 7 is a perspective view of the lenses manufactured according to the method of manufacturing a lens, according to the second embodiment of the present invention.

FIGS. 5 and 6 are plan views of lenses manufactured according to a method of manufacturing a lens, according to a second embodiment of the present invention, and FIG. 7 is a perspective view of the lenses manufactured according to the method of manufacturing a lens, according to the second embodiment of the present invention.

A 2 μm micro lens is manufactured by using the method according to the second embodiment of the present invention, wherein basic operations are identical to the method of the first embodiment of the present invention, except that a polycarbonate material is used for a substrate, the substrate is heated to 160° C., and a lens forming time is set to 2 minutes.

Figure 8:
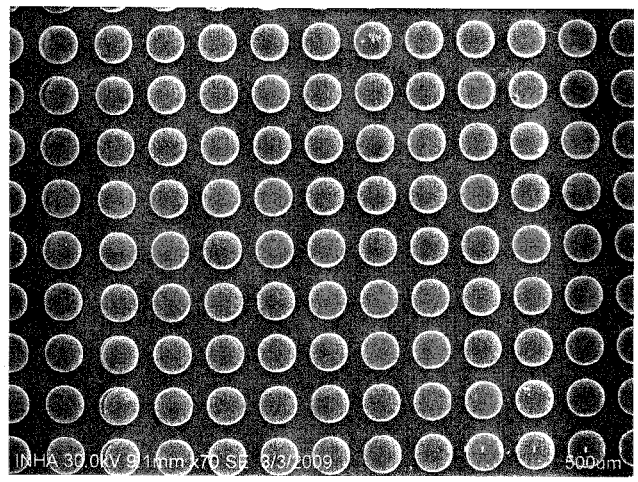
FIGS. 8 and 9 are plan views of lenses manufactured according to a method of manufacturing a lens, according to a third embodiment of the present invention.
Figure 9:
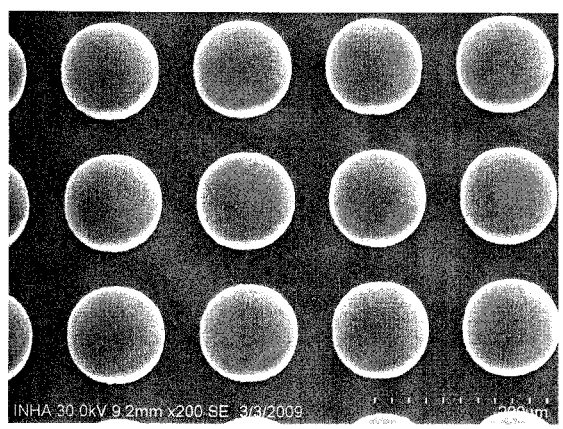
Figure 10:
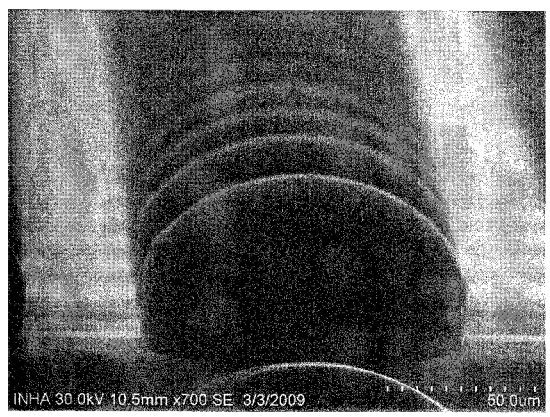
FIG. 10 is a perspective view of the lenses manufactured according to the method of manufacturing a lens, according to the third embodiment of the present invention.

FIGS. 8 and 9 are plan views of lenses manufactured according to a method of manufacturing a lens, according to a third embodiment of the present invention, FIG. 10 is a perspective view of the lenses manufactured according to the method of manufacturing a lens, according to the third embodiment of the present invention.

A 100 μm micro lens is manufactured by using the method according to the third embodiment of the present invention, wherein basic operations are identical to the method of the first embodiment of the present invention, except that a polycarbonate material is used for a substrate, the substrate is heated to 160° C., and a lens forming time is set to 3 minutes.

Figure 11:
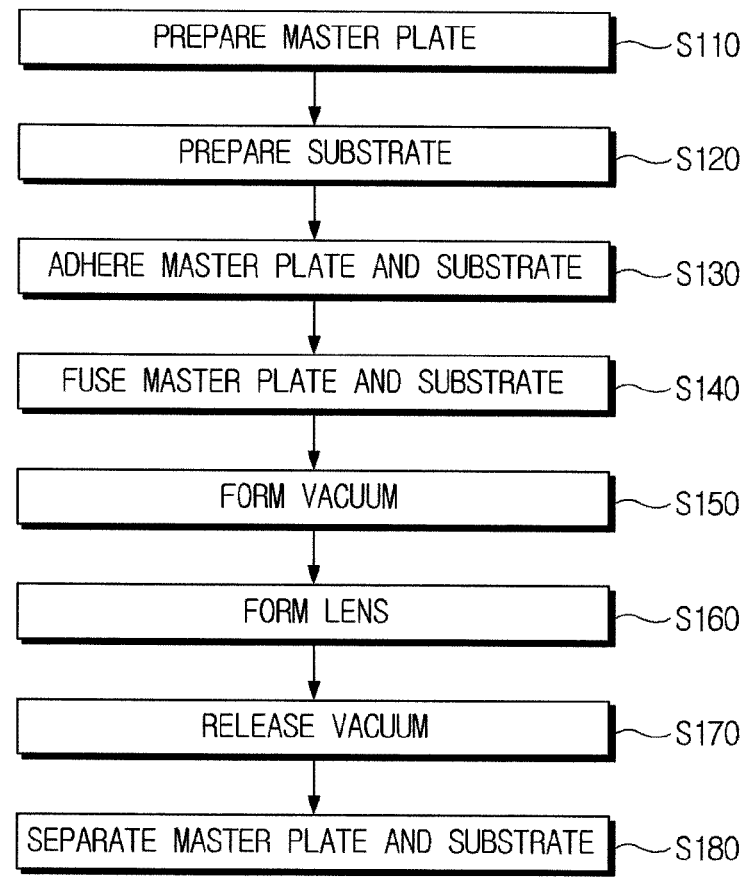
FIG. 11 is a flowchart of a method of manufacturing a concave micro lens array, according to a fourth embodiment of the present invention.

FIG. 11 is a flowchart of a method of manufacturing a concave micro lens array, according to a fourth embodiment of the present invention, and FIGS. 12 through 15 are diagrams for sequentially describing operations of the method of FIG. 11.

The method according to the fourth embodiment of the present invention is performed by the apparatus for manufacturing a micro lens array according to the first embodiment of the present invention.

Figure 12:
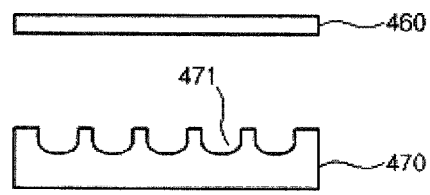
FIGS. 12 through 15 are diagrams for sequentially describing operations of the method of FIG. 11.

As shown in FIGS. 11 and 12, a master plate 470 including a plurality of molding grooves 471, which correspond to a minute pattern of a micro lens array to be manufactured, on one side of the master plate 470 is prepared inside a vacuum chamber, in which a temperature and a degree of vacuum are adjustable, in operation S110.

Next, a substrate 460 constituting a raw material of the micro lens array is prepared inside the vacuum chamber, in operation S120.

When the master plate 470 and the substrate 460 are prepared, the substrate 460 is installed to the lower surface of the upper frame 140 installed in the vacuum chamber 110, and the master plate 470 is installed to the upper surface of the lower frame 150, as shown in FIG. 1.

Figure 13:
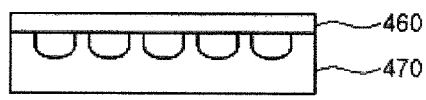

Next, as shown in FIGS. 11 and 13, the master plate 470 and the substrate 460 are adhered to each other in operation S130. Here, the elevator 130 may descend the upper frame 140 toward the lower frame 150 as shown in FIG. 2, so as to dispose the substrate 460 on the upper surface of the master plate 470 and adhere the substrate 460 and the master plate 470 to each other.

When the substrate 460 and the master plate 470 adhere to each other, the heater 141 heats up the master plate 470, and the heated master plate 470 heats up the substrate 460 on the master plate 470, and thus the substrate 460 and the master plate 470 are fused to each other, in operation S140. Here, the substrate 460 may be heated to 100° C. and 300° C. by using the master plate 470 as a medium. If the substrate 460 is heated to 100° C. or lower, a concave lens may not be smoothly formed since the substrate 460 does not transform, and if the substrate 460 to 300° C. or above, a shape of a concave lens may not be precise since the substrate 460 transforms too much.

Then, the vacuum chamber 110 is sealed, and a vacuum is formed inside the vacuum chamber 110 by using the vacuum unit 120, in operation S150. Here, a vacuum pressure of the vacuum chamber 110 is adjusted according to the shape of the concave lens to be formed. In other words, when a user selects a standard concave lens, the controller 180 controls the vacuum unit 120 so that a degree of vacuum of the vacuum chamber 110 is set to a predetermined reference value, and after operation S150, the upper frame 140 is ascended after a predetermined period of time by using the elevator 130.

Figure 14:

When the vacuum is formed inside the vacuum chamber 110, a pressure difference is generated between the vacuum chamber 110 and the molding grooves 471 since the vacuum is formed inside the vacuum chamber 110 whereas an inner side of the molding grooves 471 maintain an air pressure. According to the air pressure, the substrate 460 is depressed in an opposite direction of the molding grooves 471 to form shapes of concave lenses 461. Accordingly, as shown in FIG. 14, an array of the concave lenses 461 is formed in a micro unit on one side of the substrate 460 according to the pressure difference, in operation S160. Here, the shape of the concave lens 461 differs according to a lens forming time, i.e., from a point of time when the vacuum is formed to a point of time when the substrate 460 and the master plate 470 are separated from each other, and thus the lens forming time is adjusted according to the shape of the concave lens 461.

When the shape of the concave lens 461 is completed, the vacuum chamber 110 is opened to release the vacuum in operation S170.

Figure 15:
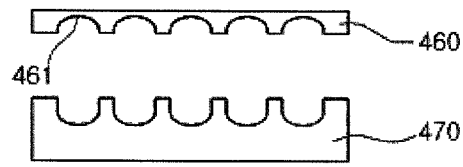
Figure 16:
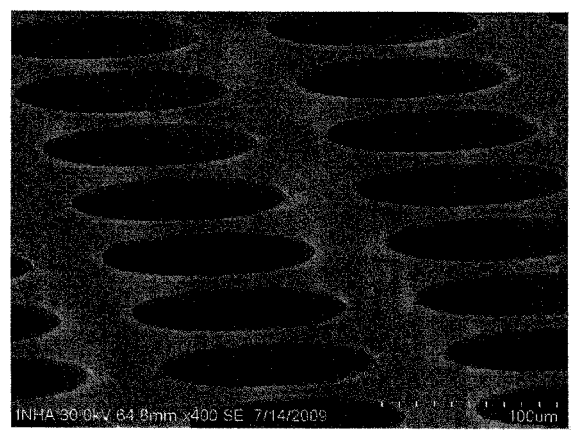
FIG. 16 is a perspective view of a concave micro lens array manufactured by using the method of FIG. 11.

Finally, the master plate 470 and the substrate 460 are cooled down, and the substrate 460 and the master plate 470 are separated from each other in operation S180 as shown in FIG. 15, thereby completing the array of concave lenses 461. For reference, FIG. 16 is a perspective view of a concave micro lens array manufactured by using the method of FIG. 11.

Meanwhile, if the user selects the concave lens 461 having a larger curvature than a standard lens, the controller 180 controls the vacuum unit 120 to increase the degree of vacuum of the vacuum chamber 110, and then after forming the vacuum, controls the elevator 130 to delay a point of time to ascend the upper frame 140 to extend the lens forming time. Alternatively, if the user selects the concave lens 461 having a smaller curvature than the standard lens, the controller 180 controls the vacuum unit 120 to decrease the degree of vacuum of the vacuum chamber 110, and then after the vacuum is formed, controls the elevator 130 to advance the point of time to ascend the upper frame 140 to reduce the lens forming time.

As described above, according to the method of forming the concave micro lens array, the array of the concave lenses 461 in a micro unit is formed by using a pressure difference due to the vacuum, and thus a separate elaborate molding process is not required to manufacture the concave lens 461. Also, since the shape of the concave lens 461 is changed by using the degree of vacuum, the concave micro lens array having various shapes may be easily manufactured. Moreover, since a method of processing a surface of a lens by using a mold surface is not used, the surface of the lens may be smooth.

A method of manufacturing a micro complex lens array, according to a fifth embodiment of the present invention will now be described with reference to accompanying drawings.

Figure 17:
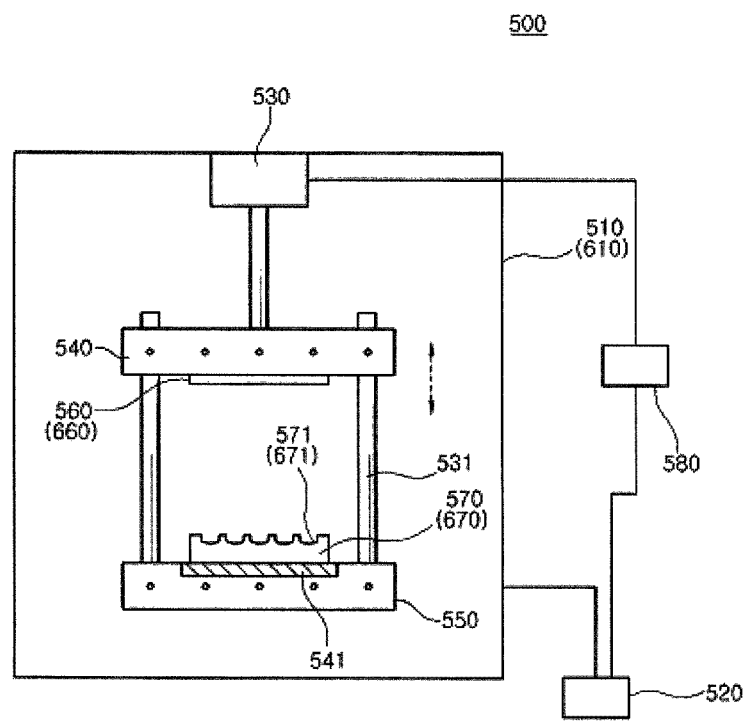
FIGS. 17 and 18 are diagrams respectively illustrating a substrate or a first lens array substrate of an apparatus for manufacturing a micro complex lens array, before and after being descended, according to a fifth embodiment of the present invention.
Figure 18:
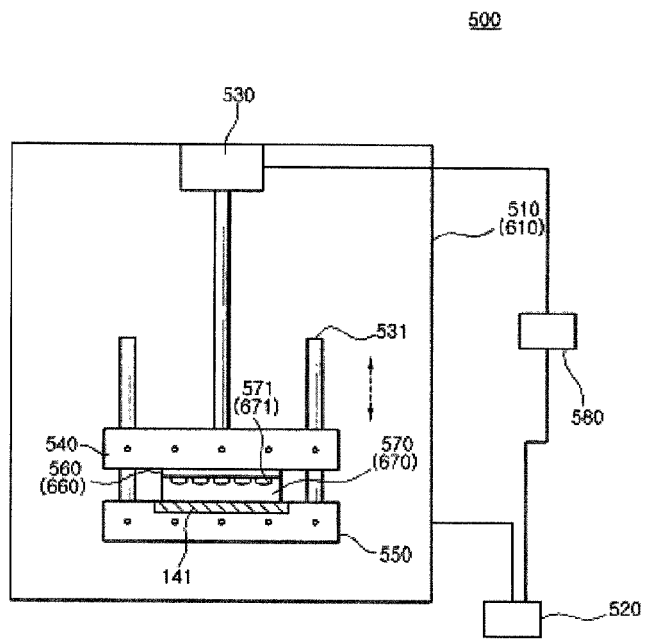

FIGS. 17 and 18 are diagrams respectively illustrating a substrate 560 or a first lens array substrate 660 of an apparatus 500 for manufacturing a micro complex lens array, before and after being descended, according to the fifth embodiment of the present invention.

Referring to FIGS. 17 and 18, the apparatus 500 according to the fifth embodiment of the present invention includes a first vacuum chamber 510 or a second vacuum chamber 610, a vacuum unit 520, an elevator 530, an upper frame 540, a lower frame 550, and a first master plate 570 or a second master plate 670.

The first or second vacuum chamber 510 or 610 may be selectively sealed to form a vacuum space therein. Also, the vacuum unit 520 for selectively forming a vacuum inside the first or second vacuum chamber 510 or 610 may be included on one side of the first or second vacuum chamber 510 or 610. The vacuum unit 520 may include a vacuum pump (not shown) for forming a vacuum pressure, and a fluid line (not shown) for moving a fluid, such as air, but details thereof are omitted herein.

The upper frame 540 is disposed inside the first or second vacuum chamber 510 or 610, and may be installed to selectively ascend or descend along a guide bar 531.

The elevator 530 for ascending or descending the upper frame 540 may be installed above the upper frame 540. The elevator 530 may be an elevating cylinder, wherein an upper portion of the elevating cylinder is installed to a ceiling of the first or second vacuum chamber 510 or 610, and a load end portion of the elevating cylinder is installed to the upper frame 540. Accordingly, the upper frame 540 ascends and descends along the guide bar 531 as the load end portion of the elevating cylinder move forward and backward.

The substrate 560 or the first lens array substrate 660 constituting a raw material of a lens is installed to a lower surface of the upper frame 540.

The lower frame 550 is installed on a bottom surface of the first vacuum chamber 510 while being spaced apart from a bottom of the upper frame 540. The first or second master plate 570 or 670 are disposed on the lower frame 550.

A plurality of first molding grooves 571 or a plurality of second molding grooves 671 are formed on an upper surface of the first master plate 570 or the second master plate 670. The first or second molding groove 571 or 671 is a groove having a cylindrical shape, and a depth of the first or second molding groove 571 or 671 is formed to be larger than a thickness of the lens to be actually manufactured. The first and second molding groove 571 and 671 according to the current embodiment of the present invention have a cylindrical shape, but the first and second molding groove 571 and 671 may have any other shape according to a purpose. Here, the second molding grooves 671 have larger arrangement intervals than the first molding grooves 571, and are formed larger than the first molding grooves 571 to include the first molding grooves 571. Reasons for different arrangements and sizes of the first and second molding grooves 571 and 671 will be described later.

A heater 541 for heating the first or second master plate 570 or 670 is installed in the lower frame 550 below the first or second master plate 570 or 670. The heater 541 includes a hot-wire heater, and heats up the first or second master plate 570 or 670, and then the heated first or second master plate 570 or 670 heats up the substrate 560 or the first lens array substrate 660 on the first or second master plate 570 or 670.

A controller 580 is installed on an outer side of the first or second vacuum chamber 510 or 610. The controller 580 controls the vacuum unit 520 and the elevating cylinder according to a shape of a lens that a user input.

Meanwhile, in order to form the micro complex lens array according to an embodiment of the present invention, a plurality of the apparatus 500 may be required, but alternatively, one apparatus 500 may be sequentially used several times. However, the structure and the operations of the apparatus 500 may be the same regardless of how the micro complex lens array is manufactured, except a number of times of using the apparatus 500.

A method of manufacturing a micro complex lens array, by using the apparatus 500 will now be described with reference to accompanying drawings.

Figure 19:
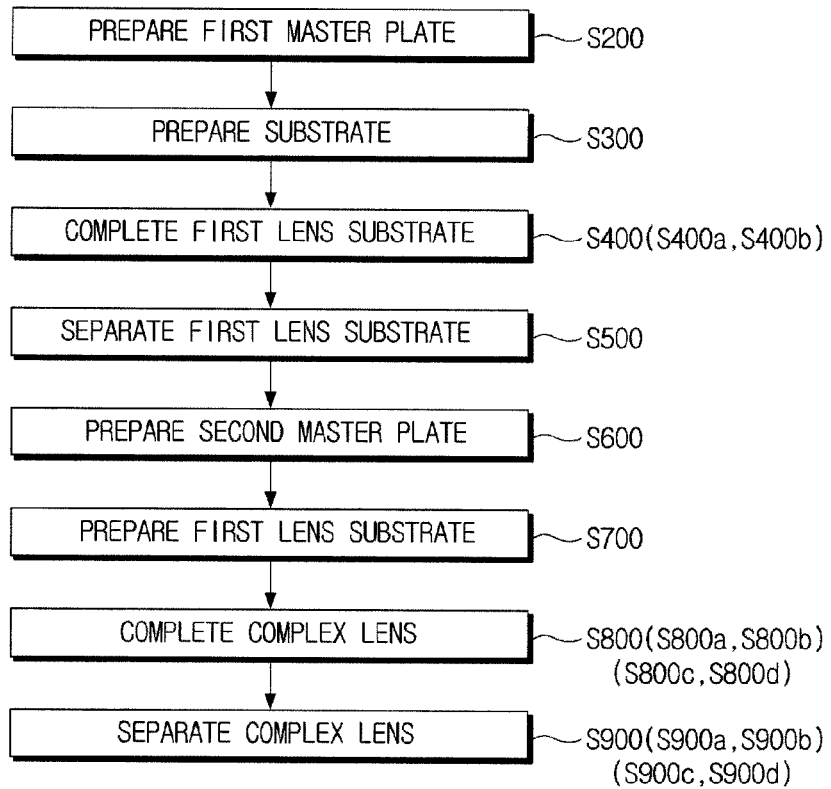
FIG. 19 is a method of manufacturing a micro complex lens array, according to the fifth embodiment of the present invention.

FIG. 19 is a method of manufacturing a micro complex lens array, according to the fifth embodiment of the present invention.

Referring to FIGS. 17 through 19, the first master plate 570 including the plurality of first molding grooves 571 in a first minute arrangement pattern on one side of the first master plate 570 is prepared inside the first vacuum chamber 510 in operation S200. Here, the controller 580 may adjust a temperature of the first master plate 570 and a degree of vacuum in the first vacuum chamber 510 by controlling the heater 541 and the vacuum unit 520.

Next, the substrate 560 constituting a raw material of a complex lens is prepared inside the first vacuum chamber 510 in operation S300. The substrate 560 may be a polymer film formed of a polymer material. Here, a material of the substrate 560 is selected according to a type of a lens, and may generally be polycarbonate (PC), polymethyl methacrylate (PMMA), or polystyrene (PS).

Next, the first lens array substrate 660 (refer to FIGS. 21 and 23) is completed by forming a plurality of first lenses 561 (refer to FIGS. 21 and 23) in a micro unit on one side of the substrate 560, in operation S400, by using a pressure difference between the first vacuum chamber 510 and spaces of the first molding grooves 571 formed to be sealed as the first master plate 570 and the substrate 560 adhere to each other. This will be described in detail later with reference to each embodiment.

Next, the first master plate 570 and the first lens array substrate 660 are cooled down, and then the first lens array substrate 660 is separated from the first master plate 570, in operation S500.

Then, the second master plate 670 including the plurality of second molding grooves 671 on one side of the second mater plate 670 is prepared inside the second vacuum chamber 610, in operation S600. Here, the second molding grooves 671 have a second minute arrangement pattern, wherein arrangement intervals are larger than the first molding grooves 571 and the first molding grooves 571 are included in the second molding grooves 671. The second vacuum chamber 610 may be the same vacuum chamber as the first vacuum chamber 510, or a separate vacuum chamber from the first vacuum chamber 510. Also, the controller 580 may adjust the temperature of the second master plate 670 and the degree of vacuum of the second vacuum chamber 610 by controlling the heater 541 and the vacuum unit 520.

The first lens array substrate 660 prepared as above is prepared inside the second vacuum chamber 610, in operation S700.

Next, a complex lens array 662 (refer to FIGS. 26 through 33) is completed by forming a plurality of complex lenses 661 (refer to FIGS. 26 and 33) each including a plurality of the first lenses 561 on a surface of the first lens array substrate 660 on which the first lenses 561 are formed, in operation S800, by using a pressure difference between the second vacuum chamber 610 and spaces of the second molding grooves 671 formed to be sealed as the second master plate 670 and the first lens array substrate 660 adhere to each other. This will be described in detail later with reference to each embodiment.

Finally, the second master plate 670 and the complex lens array 662 are cooled down, and then the complex lens array 662 is separated from the second master plate 670 in operation S900 to obtain a final micro complex lens array.

The method according to each embodiment will now be described with reference accompanying drawings. In order to avoid repetition of description, operations S400 and S800, which are different in each embodiment, will be mainly described.

Figure 20:
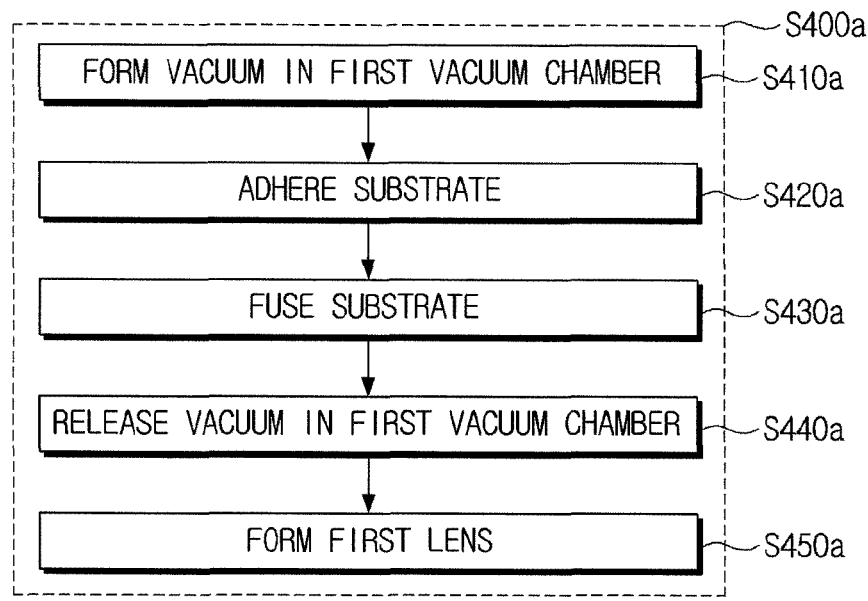
FIGS. 20 and 21 are respectively a flowchart of operation S400 and drawings for describing operation S400, according to fifth and sixth embodiments of the present invention.
Figure 21:
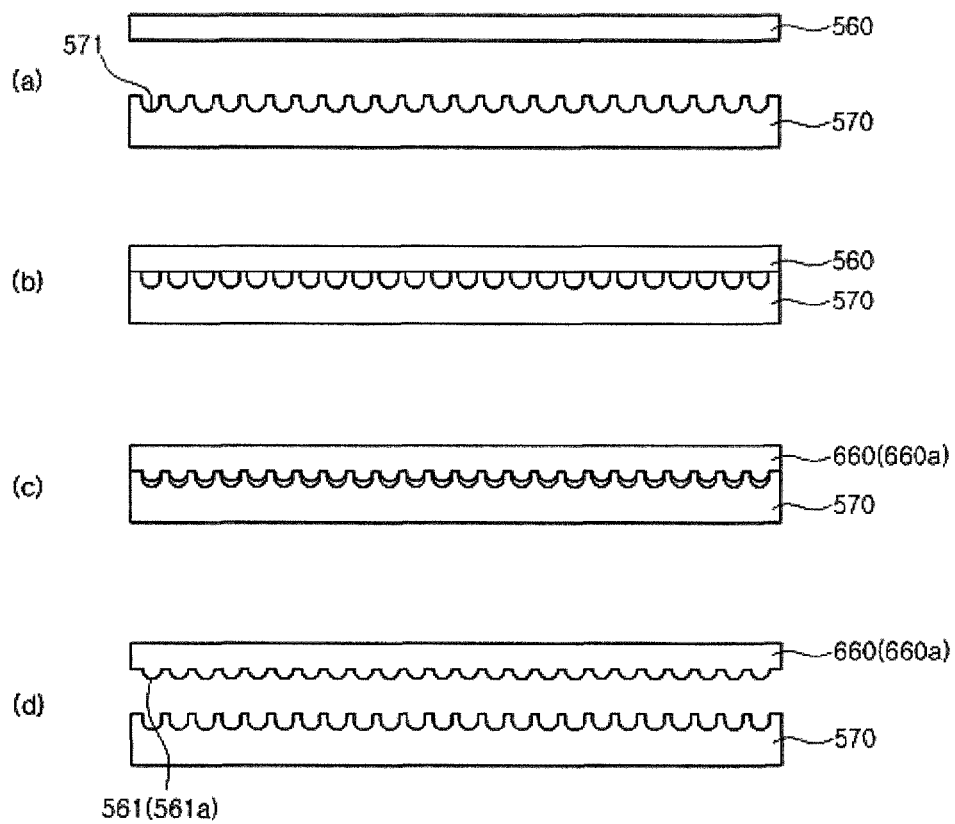
Figure 22:
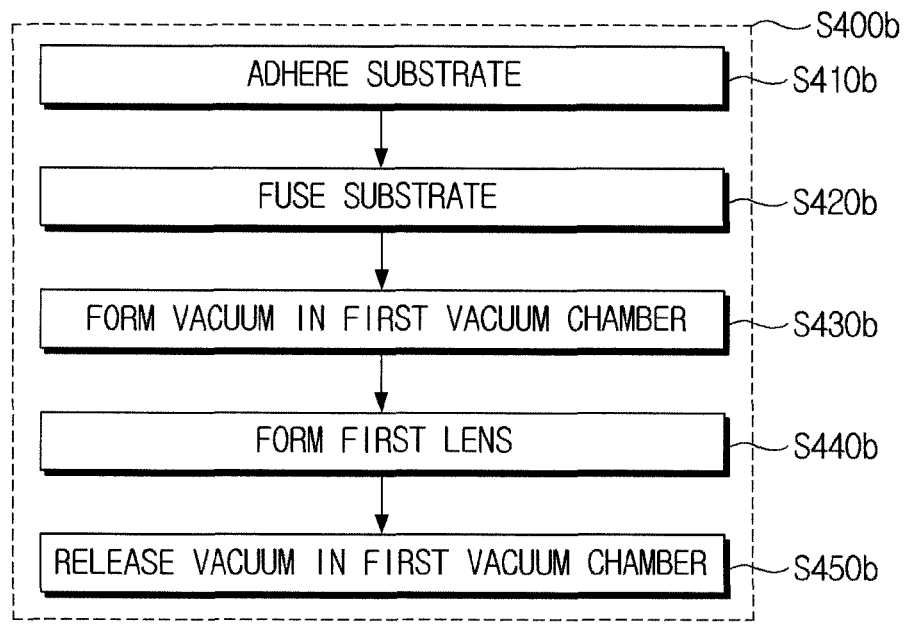
FIGS. 22 and 23 are respectively a flowchart of operation S400 and drawings for describing operation S400, according to seventh and eighth embodiments of the present invention.
Figure 23:
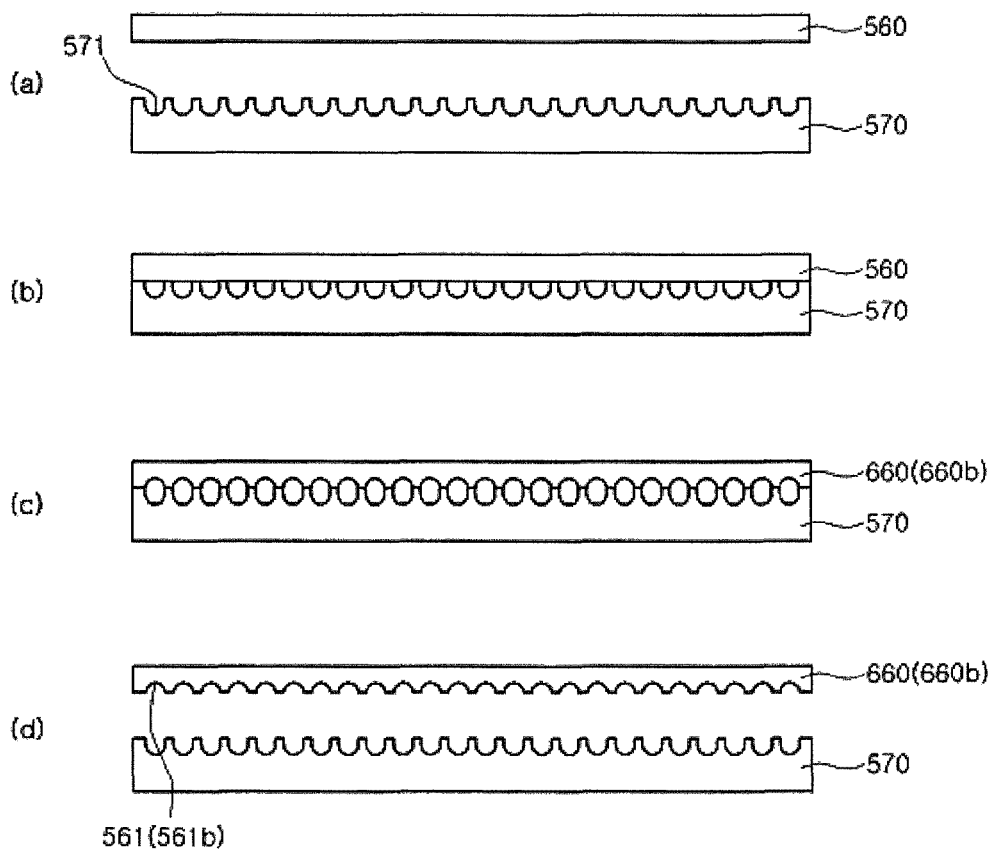
Figure 24:
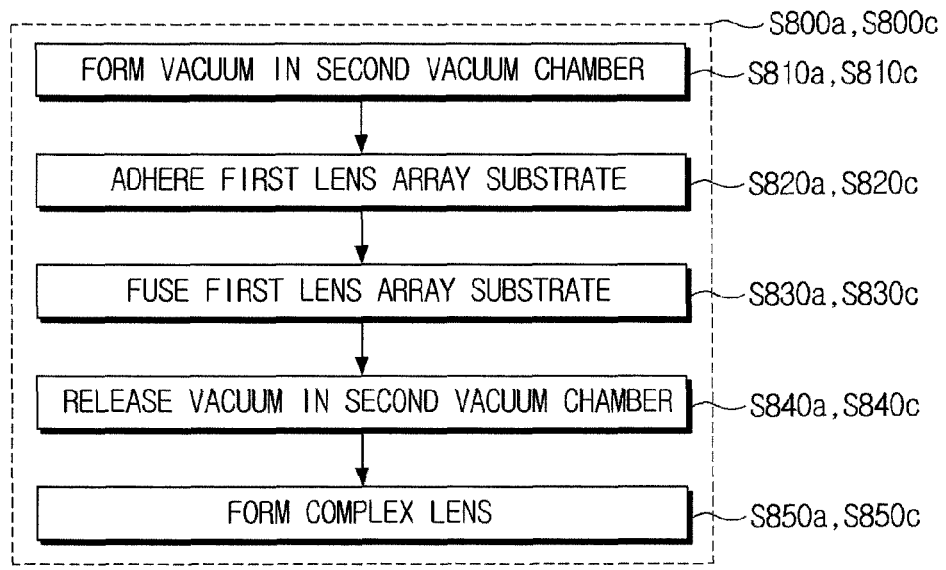
FIG. 24 is a flowchart of operation S800 according to the fifth and seventh embodiments of the present invention.
Figure 25:
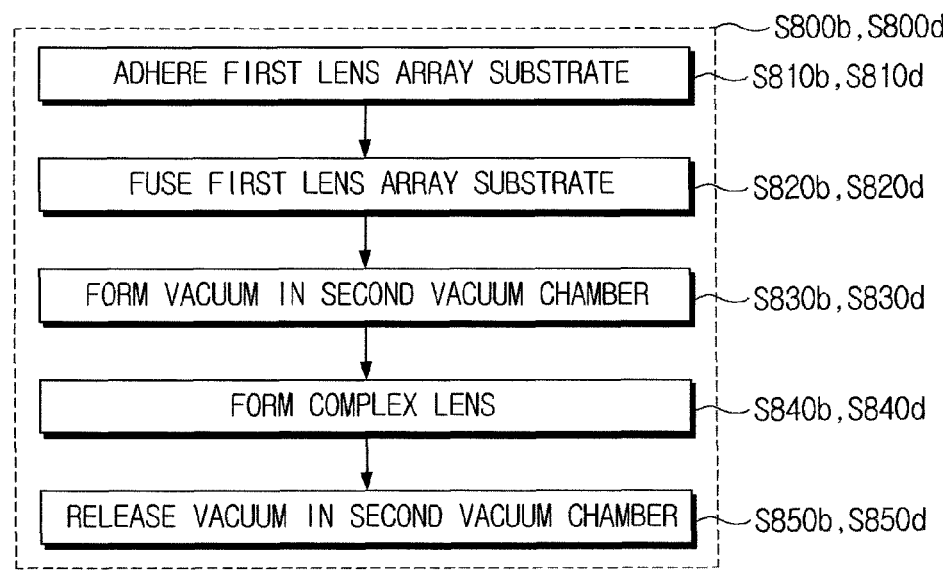
FIG. 25 is a flowchart of operation S800 according to the sixth and eighth embodiments of the present invention.

FIGS. 20 and 21 are respectively a flowchart of operation S400 and drawings for describing operation S400, according to fifth and sixth embodiments of the present invention, FIGS. 22 and 23 are respectively a flowchart of operation S400 and drawings for describing operation S400, according to seventh and eighth embodiments of the present invention, FIG. 24 is a flowchart of operation S800 according to the fifth and seventh embodiments of the present invention, FIG. 25 is a flowchart of operation S800 according to the sixth and eighth embodiments of the present invention, and FIGS. 26 through 33 are diagrams for describing operation S800 and a photographic image of a complex lens array, respectively according to the fifth through eighth embodiments of the present invention.

Operation S400a about completing a first lens array substrate 660a, and operation S800a about completing a complex lens array 662a, according to the fifth embodiment of the present invention will now be described with reference to FIGS. 17, 18, 20, 21, 24, 26, and 27.

As shown in FIGS. 17, 20, and 21, in order to complete the first lens array substrate 660a according to the fifth embodiment of the present invention, a vacuum is formed inside the first vacuum chamber 510 in operation S410a. Accordingly, the first vacuum chamber 510 is sealed, and then the vacuum is formed inside the first vacuum chamber 510 by using the vacuum unit 520. Here, the vacuum pressure of the first vacuum chamber 510 is adjusted according to a shape of a first lens 561a to be formed. In other words, if the user selects a standard lens, the controller 580 sets the degree of vacuum of the first vacuum chamber 510 to a predetermined reference value by controlling the vacuum unit 520, and then after forming the vacuum, ascends the upper frame 540 after a predetermined period of time by using the elevator 530.

Next, the first master plate 570 and the substrate 560 are adhered to each other in operation S420a. Accordingly, the elevator 530 descends the upper frame 540 toward the lower frame 550 so as to dispose the substrate 560 on an upper surface of the first master plate 570 and adhere the substrate 560 to the first master plate 570.

Then, the first master plate 570 and the substrate 560 are heated up to be fused together in operation S430a. In other words, the heater 541 heats up the first master plate 570, and the heated first master plate 570 heats up the substrate 560 on the first master plate 570 to be fused together. Here, the substrate 560 may be heated to 100° C. to 300° C. by using the first master plate 570 as a medium. If the substrate 560 is heated to 100° C. or lower, the substrate 560 does not transform and thus is not smoothly molded, and if the substrate 560 to 300° C. or above, a shape of a lens may not be precise since the substrate 560 transforms too much.

Next, the first vacuum chamber 510 is opened to release the vacuum inside the first vacuum chamber 510, in operation S440a.

Accordingly, the first lens array substrate 660a is formed as the plurality of first lenses 561a, which are convex lenses in a micro unit, are formed on one side of the substrate 560 according to a pressure difference, in operation S450a. In detail, the pressure difference is generated since the first vacuum chamber 510 maintains an air pressure when the vacuum is released, whereas inner sides of the first molding grooves 571 maintain a vacuum state, and the substrate 560 protrudes toward the first molding grooves 571 to form the first lenses 561a according to the pressure difference. Thus, as shown in FIG. 21, the first lens array substrate 660a in a micro unit is formed on one side of the substrate 560. Here, the shape of the first lens 561a differs according to a lens forming time, i.e. from when the vacuum is released to when the substrate 560 and the first master plate 570 are separated from each other, and thus the lens forming time is adjusted according to the shape of the first lens 561a.

Meanwhile, as shown in FIGS. 17, 24, 26, and 27, in order to complete the complex lens array 662a according to the fifth embodiment of the present invention, a vacuum is formed inside the second vacuum chamber 610 in operation S810a. Accordingly, the second vacuum chamber 610 is sealed, and the vacuum is formed inside the second vacuum chamber 610 by using the vacuum unit 520. In this case, the vacuum pressure of the second vacuum chamber 610 is adjusted according to a shape of a complex lens 661a to be formed.

Next, the first lens array substrate 660a prepared in operation S400a is adhered to the second master plate 670, in operation S820a. In other words, the elevator 530 descends the upper frame 540 toward the lower frame 550 so as to dispose the first lens array substrate 660a on an upper surface of the second master plate 670, and adhere the first lens array substrate 660a to the second master plate 670.

Then, the second master plate 670 and the first lens array substrate 660a are heated up to be fused together in operation S830a. Accordingly, the heater 541 heats up the second master plate 670, and the heated second master plate 670 heats up the first lens array substrate 660a on the second master plate 670 so that the second master plate 670 and the first lens array substrate 660a are fused together. Here, the first lens array substrate 660a may be heated to 100° C. to 300° C. by using the second master plate 670 as a medium.

Next, the second vacuum chamber 610 is opened to release the vacuum in the second vacuum chamber 610, in operation S840a.

Figure 26:
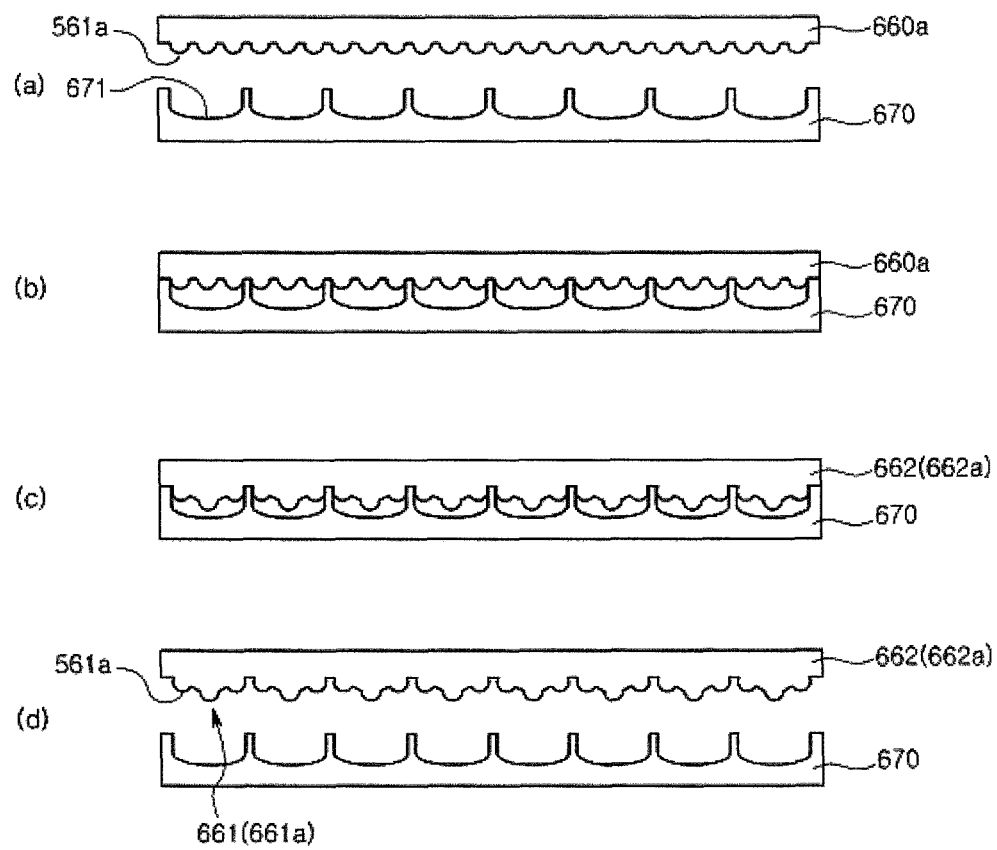
FIGS. 26 and 27 are respectively diagrams for describing operation S800 and a photographic image of a complex lens array, according to the fifth embodiment of the present invention.
Figure 27:
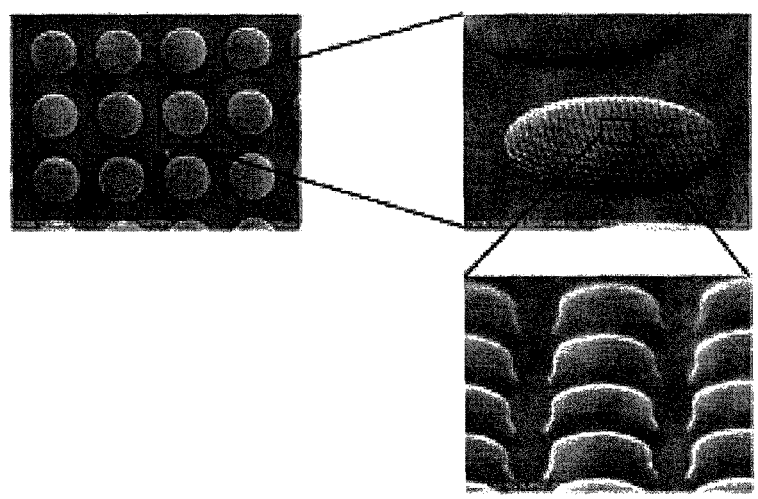

Then, the complex lens array 662a is formed in operation S850a as the plurality of complex lenses 661a having convex lens shapes and each including the plurality of first lenses 561a are formed on the first lens array 660a according to a pressure difference. In detail, the pressure difference is generated since the second vacuum chamber 610 maintains an air pressure when the vacuum is released, whereas inner sides of the second molding grooves 671 maintain a vacuum state, and the first lens array substrate 660a protrudes toward the second molding grooves 671 to form the complex lens 661a having the convex lens shapes and each including the plurality of first lenses 561a according to the pressure difference. Thus, as shown in FIGS. 26 and 27, the complex lens array 662a including the complex lenses 661a having the convex lens shapes and each including the first lenses 561a having the convex lens shapes is formed. Here, the shapes of the complex lenses 661a are determined based on the lens forming time, i.e., from when the vacuum is released to when the first lens array substrate 660a and the second master plate 670 are separated from each other.

As described above, according to the method of the fifth embodiment of the present invention, the complex lens array 662a having a complex structure, in which a plurality of micro lenses in convex lens shapes are formed on a surface of a convex lens, as shown in FIGS. 26 and 27, may be obtained.

Operation S800b according to the sixth embodiment of the present invention will now be described with reference to FIGS. 17, 20, 21, 25, 28, and 29. Here, operation S400a is identical to the fifth embodiment described with reference to FIGS. 20 and 21, and thus details thereof will not be repeated.

In order to form a complex lens array 662b according to the sixth embodiment of the present invention, the second master plate 670 and the first lens array substrate 660a are adhered to each other in operation S810b, as shown in FIGS. 17, 25, 28, and 29. Accordingly, the elevator 530 descends the upper frame 540 toward the lower frame 550 so as to dispose the first lens array substrate 660a on the upper surface of the second master plate 670 to adhere the first lens array substrate 660a and the second master plate 670 to each other.

Then, the second master plate 670 and the first lens array substrate 660a are heated up to be fused together in operation S820b. In other words, the heater 541 heats up the second master plate 670, and the heated second master plate 670 heats up the first lens array substrate 660a on the second master plate 670 so that the second master plate 670 and the first lens array substrate 660a are fused together. Here, the first lens array substrate 660a may be heated to 100° C. to 300° C. by using the second master plate 670 as a medium.

Next, the vacuum is formed inside the second vacuum chamber 610 in operation S830b. In other words, the second vacuum chamber 610 is sealed, and the vacuum is formed inside the second vacuum chamber 610 by using the vacuum unit 520. In this case as well, the vacuum pressure of the second vacuum chamber 610 is adjusted according to a shape of a complex lens 661b to be formed.

Figure 28:
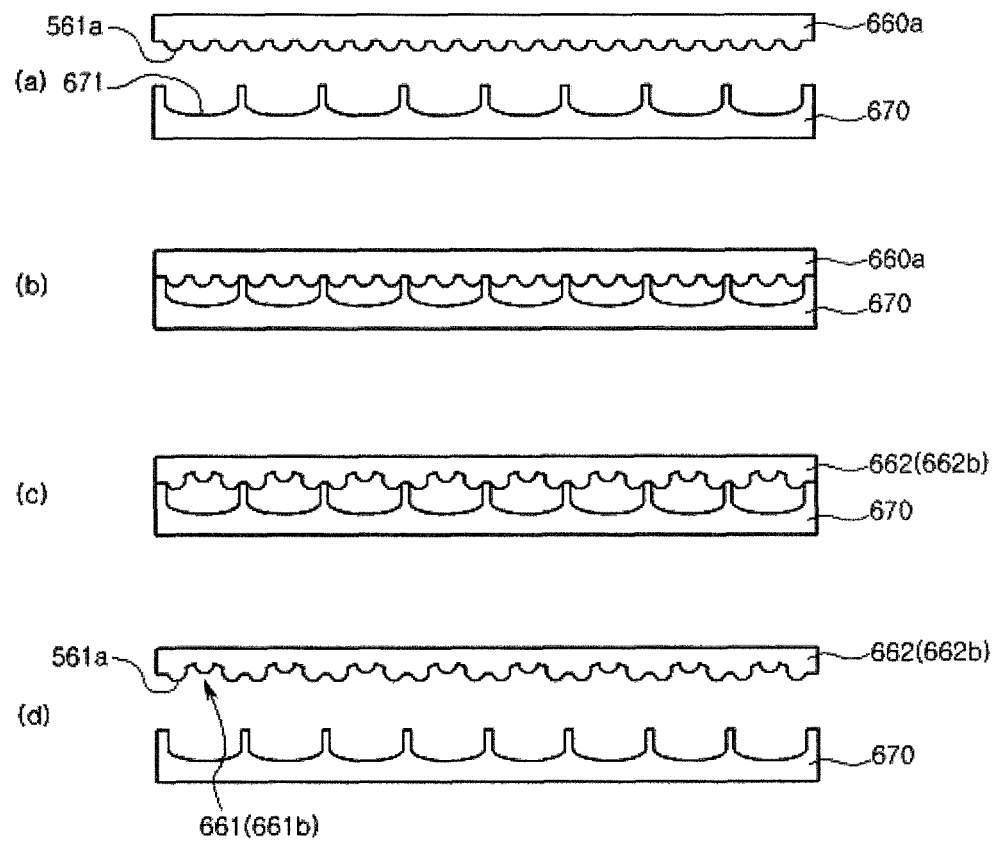
FIGS. 28 and 29 are respectively diagrams for describing operation S800 and a photographic image of a complex lens array, according to the sixth embodiment of the present invention.
Figure 29:
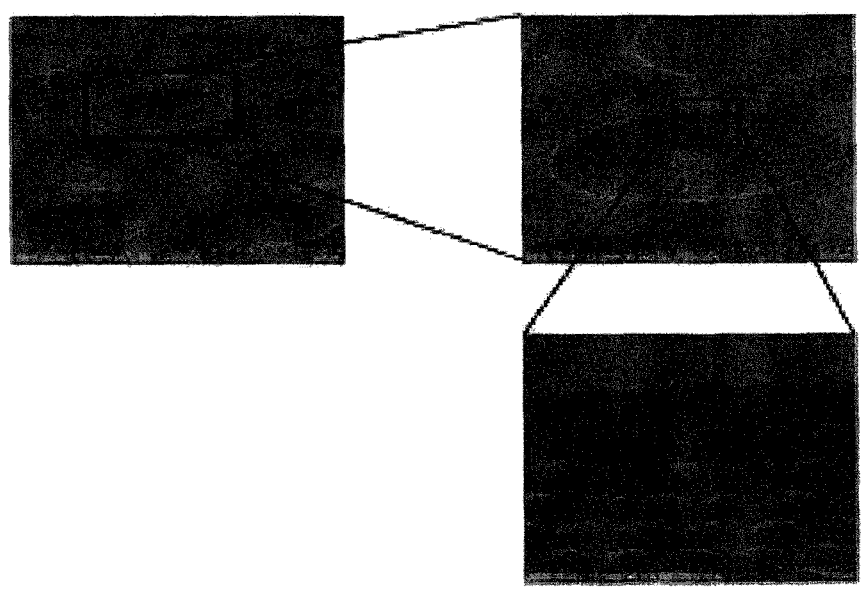

Accordingly, the complex lens array 662b is formed in operation S840b as the plurality of complex lenses 661b having convex lens shapes and each including the plurality of first lenses 561a are formed on the first lens array 660a according to a pressure difference. In detail, the pressure difference is generated since the second vacuum chamber 610 maintains an air pressure when the vacuum is released, whereas inner sides of the second molding grooves 671 maintain a vacuum state, and the first lens array substrate 660a is depressed in an opposite direction from the second molding grooves 671 to form the complex lens 661b having concave lens shapes and each including the plurality of first lenses 561a having the convex lens shapes according to the pressure difference. Thus, as shown in FIGS. 28 and 29, the complex lens array 662b including the complex lenses 661b having the concave lens shapes and each including the first lenses 561a having the convex lens shapes is formed. Here, the shapes of the complex lenses 661b are determined based on the lens forming time, i.e., from when the vacuum is released to when the first lens array substrate 660a and the second master plate 670 are separated from each other.

Finally, the second vacuum chamber 610 is opened to release the vacuum in operation S850b, thereby completing the complex lens array 662b.

As described above, according to the method of the sixth embodiment, the complex lens array 662b having a complex structure, in which a plurality of micro lenses in convex lens shapes are formed on a surface of a concave lens, as shown in FIGS. 28 and 29, may be obtained.

Operation S400b about completing a first lens array substrate 660b, and operation S800c about completing a complex lens array 662c, according to the seventh embodiment of the present invention will now be described with reference to FIGS. 17, 22, 23, 24, 30, and 31.

As shown in FIGS. 17, 22, and 23, in order to complete the first lens array substrate 660b according to the seventh embodiment of the present invention, the first master plate 570 and the substrate 560 are adhered to each other in operation S5410b. Accordingly, the elevator 530 descends the upper frame 540 toward the lower frame 550 so as to dispose the substrate 560 on an upper surface of the first master plate 570 and adhere the substrate 560 to the first master plate 570.

Next, the first master plate 570 and the substrate 560 are heated up to be fused together in operation S420b. In other words, the heater 541 heats up the first master plate 570, and the heated first master plate 570 heats up the substrate 560 on the first master plate 570 to be fused together. Here, the substrate 560 may be heated to 100° C. to 300° C. by using the first master plate 570 as a medium.

Then, a vacuum is formed inside the first vacuum chamber 510 in operation S430b. Accordingly, the first vacuum chamber 510 is sealed, and then the vacuum is formed inside the first vacuum chamber 510 by using the vacuum unit 520. Here, the vacuum pressure of the first vacuum chamber 510 is adjusted according to a shape of a first lens 561b to be formed.

Accordingly, the first lens array substrate 660b is formed as the plurality of first lenses 561b, which are concave lenses, are formed on one side of the substrate 560 according to a pressure difference, in operation S440b. In detail, the pressure difference is generated since the first vacuum chamber 510 maintains an air pressure when the vacuum is released, whereas inner sides of the first molding grooves 571 maintain a vacuum state, and the substrate 560 is depressed in the opposite direction from the first molding grooves 571 to form the first lenses 561b according to the pressure difference. Thus, as shown in FIG. 23, the first lens array substrate 660b in a micro unit and having the concave lens shapes is formed on one side of the substrate 560 according to the pressure difference. Here, the shape of the first lens 561b differs according to a lens forming time, i.e. from when the vacuum is released to when the substrate 560 and the first master plate 570 are separated from each other, and thus the lens forming time is adjusted according to the shape of the first lens 561b.

Finally, the first vacuum chamber 510 is opened to release the vacuum inside the first vacuum chamber 510 in operation S450b, thereby completing the first lens array substrate 660b having the concave lens shapes.

Meanwhile, operation S800c about completing of the complex lens array 662c according to the seventh embodiment of the present invention is identical to operation S800a according to the fifth embodiment of the present invention as shown in FIGS. 17, 18, 24, 30, and 31, and thus will be briefly described while omitting overlapping descriptions.

Operation S800c according to the seventh embodiment of the present invention includes, similarly to operation S800a, forming a vacuum inside the second vacuum chamber 610 in operation S810c, adhering the second master plate 670 and the first lens array substrate 660b in operation S820c, heating and fusing the second master plate 670 and a first lens array substrate 860b in operation S830c, releasing the vacuum in the second vacuum chamber 610 by opening the second vacuum chamber 610 in operation S840c, forming the complex lens array 662c including a plurality of complex lenses 661c having convex lens shapes and each including the plurality of first lenses 561b according to the pressure difference in operation S850c.

Figure 30:
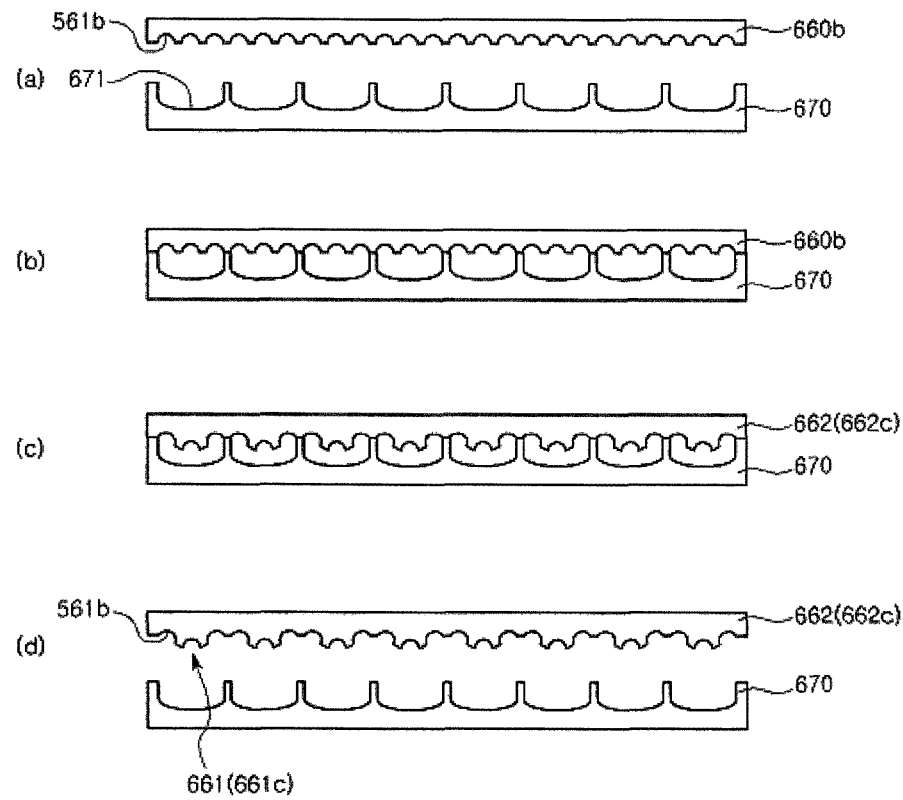
FIGS. 30 and 31 are respectively diagrams for describing operation S800 and a photographic image of a complex lens array, according to the seventh embodiment of the present invention.
Figure 31:
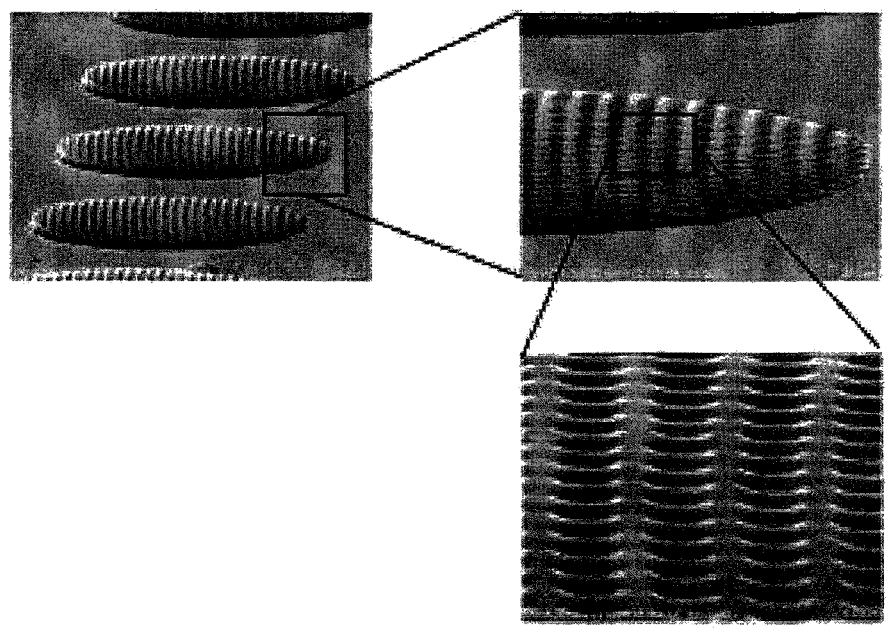

As described above, according to the method of the seventh embodiment of the present invention, the complex lens array 662c having a complex structure, in which a plurality of micro lenses in concave lens shapes are formed on a surface of a convex lens, as shown in FIGS. 30 and 31, may be obtained.

Operation S800d according to the eighth embodiment of the present invention will now be described with reference to FIGS. 17, 18, 22, 23, 25, 32, and 33. Here, operation S400b is identical to the seventh embodiment described with reference to FIGS. 22 and 23, and thus details thereof will not be repeated.

Meanwhile, as shown in FIGS. 17, 18, 25, 32, and 33, operation S800d about completing of a complex lens array 662d according to the eighth embodiment of the present invention is identical to operation S800b about completing the complex lens array 662b according to the sixth embodiment of the present invention, and thus will be briefly described while omitting overlapping descriptions.

Operation S800d according to the eighth embodiment of the present invention includes, similarly to operation S800b of the sixth embodiment, adhering the second master plate 670 and the first lens array substrate 660b in operation S810d, fusing the second master plate 670 and the first lens array substrate 660b to each other by heating the second master plate 670 and the first lens array substrate 660b in operation S820d, forming the vacuum inside the second vacuum chamber 610 in operation S830d, forming the complex lens array 662d including a plurality of complex lenses 661d having concave lens shapes and each including the plurality of first lenses 561b according to the pressure difference in operation S840d, and releasing the vacuum by opening the second vacuum chamber 610 in operation S850d.

Figure 32:
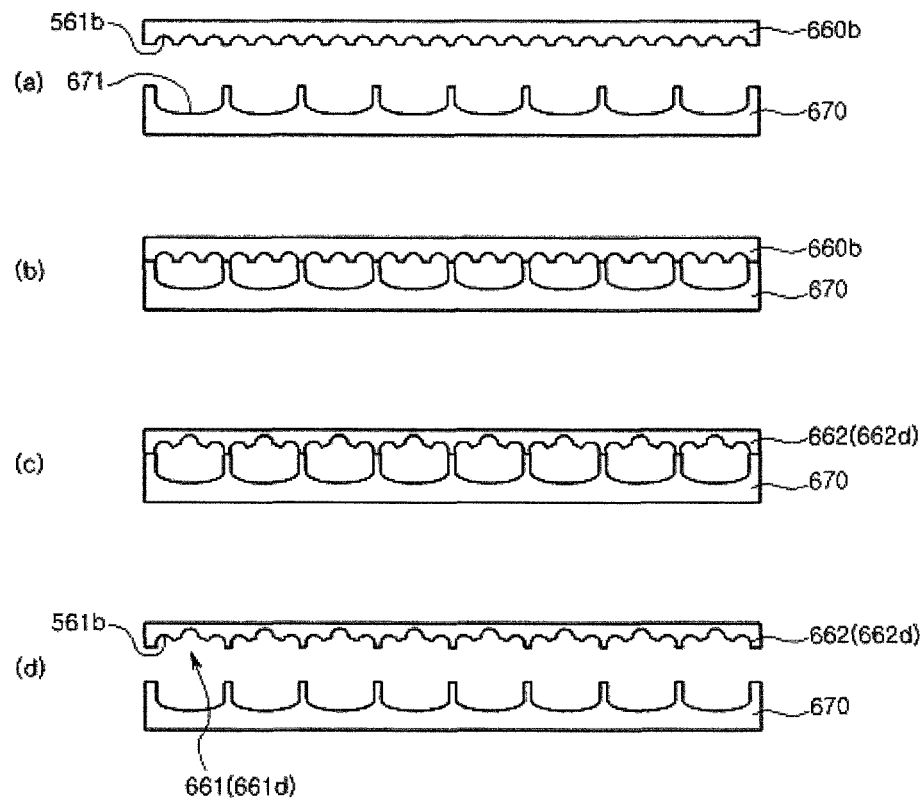
FIGS. 32 and 33 are respectively diagrams for describing operation S800 and a photographic image of a complex lens array, according to the eighth embodiment of the present invention.
Figure 33:
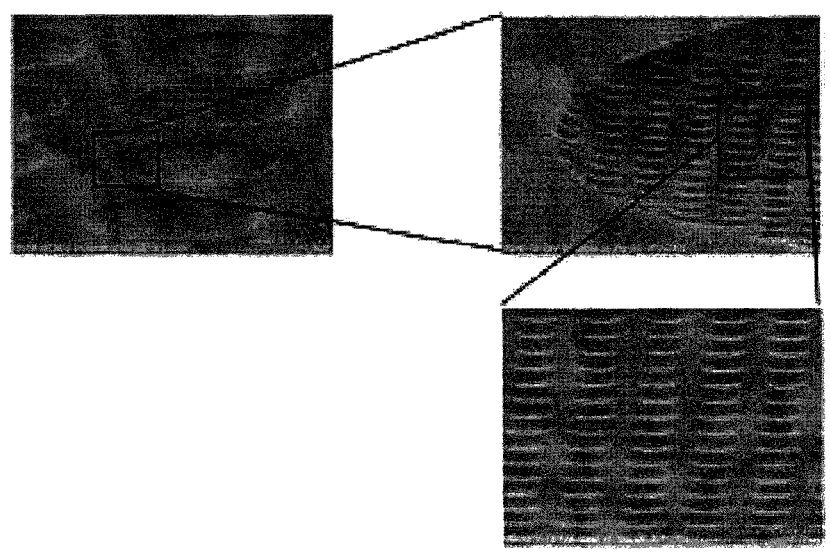

As described above, according to the method of the eighth embodiment of the present invention, the complex lens array 662d having a complex structure, in which a plurality of micro lenses in concave lens shapes are formed on a surface of another concave lens, as shown in FIGS. 32 and 33, may be obtained.

According to the embodiments of the present invention, the complex lens arrays 662, 662a, 662b, 662c, and 662d having the complex structures can be flexibly manufactured by using the pressure difference according to the vacuum, and production efficiency can be improved since a separate elaborate molding process is not required.

Also, a shape of a micro complex lens can be changed by adjusting a degree of vacuum, and thus a micro complex lens array having various shapes can be easily manufactured. In addition, since a method of processing a surface of a lens by using a mold surface is not used, the surface of the lens may be smooth.

The embodiment of the present invention may be used to manufacture a micro lens for controlling convergence, diffusion, reflection, etc. of light in a display device, such as a charge-coupled device of a digital camera or a liquid crystal display (LCD) monitor for a computer, a component for optical communication, or a light emitting diode.

According to the present invention, a lens array in a micro unit is manufactured by using a pressure difference according to a vacuum, and thus a separate elaborate molding process for manufacturing the lens array is not required. Accordingly, production efficiency of the lens array is increased.

Also, since a shape of a lens can be variously changed by adjusting a degree of vacuum, the lens having various shapes may be easily manufactured.

Moreover, since a method of processing a surface of a lens by using a mold surface is not used, the surface of the lens may be smooth.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing micro lens array, the method comprising:
    preparing a master plate comprising a plurality of molding grooves on one side of the master plate, inside a vacuum chamber;
    preparing a substrate constituting a raw material of a lens on the side of the master plate where the plurality of molding grooves are included;
    forming a vacuum inside the vacuum chamber;
    adhering the master plate and the substrate;
    heating the substrate after adhering the master plate and the substrate;
    releasing the vacuum in the vacuum chamber by opening the vacuum chamber after heating the substrate; and
    forming the lens by separating the substrate from the master plate after cooling down the master plate and the substrate,
    wherein the forming of the vacuum comprises adjusting a curvature of the lens by adjusting a degree of vacuum in the vacuum chamber, wherein a depth of each molding groove is formed to be larger than a thickness of each lens to be manufactured so that a rounded surface of each lens is formed without being in contact with a bottom surface of each molding groove.

2. A method of manufacturing a micro lens array, the method comprising:
    preparing a master plate comprising a plurality of molding grooves on one side of the master plate, inside a vacuum chamber;
    preparing a substrate constituting a raw material of a lens on the side of the master plate where the plurality of molding grooves are included;
    forming a vacuum inside the vacuum chamber;
    adhering the master plate and the substrate;
    heating the substrate after adhering the master plate and the substrate;
    releasing the vacuum in the vacuum chamber by opening the vacuum chamber after heating the substrate; and
    forming the lens by separating the substrate from the master plate after cooling down the master plate and the substrate,
    wherein the forming of the lens comprises adjusting a curvature of the lens by adjusting a lens forming time, wherein a depth of each molding groove is formed to be larger than a thickness of each lens to be manufactured so that a rounded surface of each lens is formed without being in contact with a bottom surface of each molding groove.

* * * * *